(12) United States Patent
Chui et al.

(10) Patent No.: US 7,342,705 B2
(45) Date of Patent: Mar. 11, 2008

(54) SPATIAL LIGHT MODULATOR WITH INTEGRATED OPTICAL COMPENSATION STRUCTURE

(75) Inventors: Clarence Chui, San Mateo, CA (US); Jeffrey B. Sampsell, San Jose, CA (US); William J. Cummings, San Francisco, CA (US); Ming-Hau Tung, San Francisco, CA (US)

(73) Assignee: IDC, LLC, San Francisco, CA (US)

( * ) Notice: Subject to any disclaimer, the term of this patent is extended or adjusted under 35 U.S.C. 154(b) by 0 days.

(21) Appl. No.: 11/036,965

(22) Filed: Jan. 14, 2005

(65) Prior Publication Data

US 2005/0179977 A1 Aug. 18, 2005

Related U.S. Application Data

(60) Provisional application No. 60/613,482, filed on Sep. 27, 2004, provisional application No. 60/613,536, filed on Sep. 27, 2004, provisional application No. 60/613,542, filed on Sep. 27, 2004, provisional application No. 60/541,607, filed on Feb. 3, 2004.

(51) Int. Cl.
*G02B 26/00* (2006.01)
(52) U.S. Cl. .................... 359/237; 359/291
(58) Field of Classification Search ............... 359/290, 359/291, 292, 298, 223, 224, 320, 322
See application file for complete search history.

(56) References Cited

U.S. PATENT DOCUMENTS

| | | | |
|---|---|---|---|
| 5,914,804 A | 6/1999 | Goossen | |
| 5,933,183 A * | 8/1999 | Enomoto et al. | ........... 347/241 |
| 6,381,022 B1 | 4/2002 | Zavracky | |
| 7,002,726 B2 * | 2/2006 | Patel et al. | .................. 359/290 |
| 7,009,754 B2 * | 3/2006 | Huibers | ....................... 359/291 |
| 7,142,347 B2 * | 11/2006 | Islam | .......................... 359/290 |
| 7,161,730 B2 * | 1/2007 | Floyd | .......................... 359/291 |
| 2002/0126364 A1 | 9/2002 | Miles et al. | |
| 2003/0210363 A1 | 11/2003 | Yasukawa et al. | |

FOREIGN PATENT DOCUMENTS

DE 19622748 12/1997

OTHER PUBLICATIONS

International Search Report of PCT Application No.: PCT/US2005/002986.

* cited by examiner

*Primary Examiner*—Ricky Mack
*Assistant Examiner*—Tuyen Tra
(74) *Attorney, Agent, or Firm*—Knobbe, Martens, Olson & Bear, LLP (57) ABSTRACT

A spatial light modulator comprises an integrated optical compensation structure, e.g., an optical compensation structure arranged between a substrate and a plurality of individually addressable light-modulating elements, or an optical compensation structure located on the opposite side of the light-modulating elements from the substrate. The individually addressable light-modulating elements are configured to modulate light transmitted through or reflected from the transparent substrate. Methods for making such spatial light modulators involve fabricating an optical compensation structure over a substrate and fabricating a plurality of individually addressable light-modulating elements over the optical compensation structure. The optical compensation structure may be a passive optical compensation structure. The optical compensation structure may include one or more of a supplemental frontlighting source, a diffuser, a black mask, a diffractive optical element, a color filter, an antireflective layer, a structure that scatters light, a microlens array, and a holographic film.

36 Claims, 5 Drawing Sheets

SPATIAL LIGHT MODULATOR WITH INTEGRATED OPTICAL COMPENSATION STRUCTURE

CROSS-REFERENCE TO RELATED APPLICATIONS

This application claims priority to U.S. Provisional Patent Application Ser. No. 60/541,607, filed Feb. 3, 2004; U.S. Provisional Patent Application Ser. No. 60/613,482, filed Sep. 27, 2004; U.S. Provisional Patent Application Ser. No. 60/613,536, filed Sep. 27, 2004; and U.S. Provisional Patent Application Ser. No. 60/613,542, filed Sep. 27, 2004; all of which are hereby incorporated by reference in their entireties.

BACKGROUND

1. Field of the Invention

This invention relates to improvements in the manufacturing and performance of spatial light modulators such as interferometric modulators.

2. Description of the Related Art

Spatial light modulators are display devices that contain arrays of individually addressable light modulating elements. Examples of spatial light modulators include liquid crystal displays and interferometric modulator arrays. The light modulating elements in such devices typically function by altering the characteristics of light reflected or transmitted through the individual elements, thus altering the appearance of the display.

SUMMARY

As spatial light modulators become increasingly sophisticated, the inventor anticipates that difficulties associated with fabricating them by current manufacturing process flows will also increase. Accordingly, the inventor has developed spatial light modulators having integrated optical compensation structures and methods for making them.

An embodiment provides a spatial light modulator that includes a substrate; a plurality of individually addressable light-modulating elements arranged over the substrate and configured to modulate light transmitted through the substrate; and an optical compensation structure; wherein the optical compensation structure is arranged between the substrate and the plurality of individually addressable light-modulating elements. In certain embodiments, the optical compensation structure is a passive optical compensation structure.

An embodiment provides a spatial light modulator that includes a substrate; a plurality of individually addressable light-modulating elements arranged over the substrate and configured to modulate light transmitted through the substrate; and an optical compensation structure; wherein the plurality of individually addressable light-modulating elements is arranged between the substrate and the optical compensation structure. In certain embodiments, the optical compensation structure is a passive optical compensation structure.

Another embodiment provides a method of making a spatial light modulator that includes fabricating an optical compensation structure over a transparent substrate; and fabricating a plurality of individually addressable light-modulating elements over the optical compensation structure, the individually addressable light-modulating elements being configured to modulate light transmitted through the transparent substrate. In certain embodiments, fabricating the optical compensation structure includes fabricating a passive optical compensation structure.

Another embodiment provides a method of making a spatial light modulator that includes fabricating a plurality of individually addressable light-modulating elements over a substrate; and fabricating an optical compensation structure over the plurality of individually addressable light-modulating elements, the individually addressable light-modulating elements being configured to modulate light transmitted through the optical compensation structure. In certain embodiments, fabricating the optical compensation structure includes fabricating a passive optical compensation structure.

Another embodiment provides a spatial light modulator that includes a transparent substrate; a plurality of individually addressable interferometric light-modulating elements arranged over the transparent substrate and configured to modulate light transmitted through the transparent substrate, the interferometric light-modulating elements comprising a cavity and a movable wall; and at least one optical compensation structure arranged between the transparent substrate and the plurality of individually addressable interferometric light-modulating elements, the optical compensation structure comprising a black mask, color filter, or diffuser.

Another embodiment provides a spatial light modulator that includes a substrate; a plurality of individually addressable interferometric light-modulating elements arranged over the substrate and configured to modulate light transmitted through or reflected from the substrate, the interferometric light-modulating elements comprising a cavity and a movable wall; and at least one optical compensation structure, the plurality of individually addressable interferometric light-modulating elements being arranged between the substrate and the optical compensation structure, the optical compensation structure comprising a structure selected from the group consisting of an anti-reflective layer, a diffractive optical element, a structure that scatters light, a black mask, a color filter, a diffuser, a microlens array, and a holographic film.

Another embodiment provides a spatial light modulator that includes a substrate; a means for modulating light transmitted through or reflected from the substrate; and a means for compensating the light transmitted through or reflected from the substrate; wherein the means for compensating the light is operatively arranged between the substrate and the means for modulating light transmitted through or reflected from the substrate. In certain embodiments, the means for compensating the light transmitted through or reflected from the substrate is a means for passively compensating the light transmitted through or reflected from the substrate.

Another embodiment provides a spatial light modulator that includes a substrate; a means for modulating light transmitted through or reflected from the substrate; and a means for compensating the light transmitted through or reflected from the substrate;

wherein the means for modulating light transmitted through or reflected from the substrate is operatively arranged between the substrate and the means for compensating the light. In certain embodiments, the means for compensating the light transmitted through or reflected from the substrate is a means for passively compensating the light transmitted through or reflected from the substrate.

Another embodiment provides a spatial light modulator made by a method that includes fabricating an optical compensation structure over a transparent substrate; and fabricating a plurality of individually addressable light-modulating elements over the optical compensation structure, the individually addressable light-modulating elements being configured to modulate light transmitted through the transparent substrate.

Another embodiment provides a spatial light modulator made by a method that includes fabricating a plurality of individually addressable light-modulating elements over a substrate; and fabricating an optical compensation structure over the plurality of individually addressable light-modulating elements, the individually addressable light-modulating elements being configured to modulate light transmitted through the optical compensation structure.

These and other embodiments are described in greater detail below.

BRIEF DESCRIPTION OF THE DRAWINGS

These and other aspects of the invention will be readily apparent from the following description and from the appended drawings, which are meant to illustrate and not to limit the invention, and wherein.

DETAILED DESCRIPTION OF PREFERRED EMBODIMENTS

A preferred embodiment is an interferometric modulator that includes at least one integrated optical compensation structure. In some configurations, the optical compensation structure is arranged between the substrate and the light-modulating elements of the interferometric modulator. In other configurations, the light-modulating elements are arranged between the substrate and the optical compensation structure.

Figure 1A:
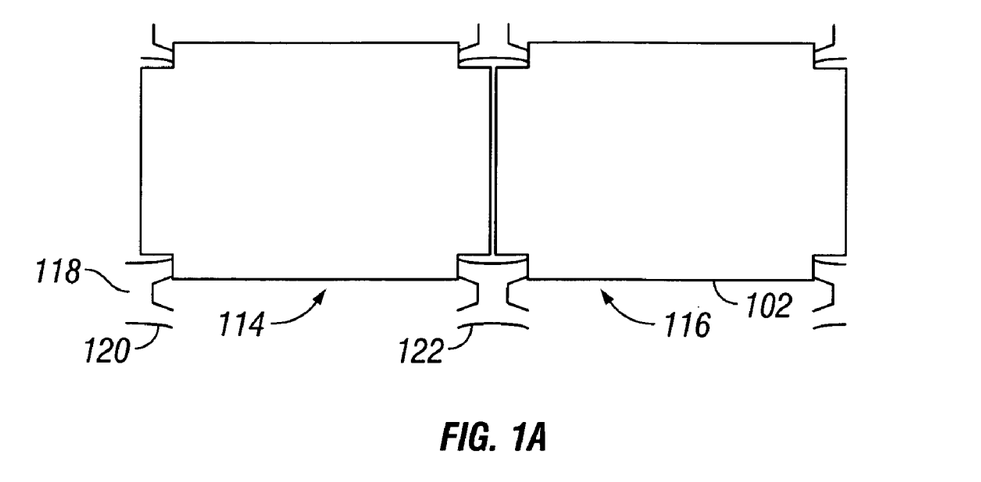
FIGS. 1A and 1B illustrate some characteristics of a typical interferometric modulator (see FIGS. 1A and 1B of U.S. Patent Publication No. 2002/0126364 A1).
Figure 1B:
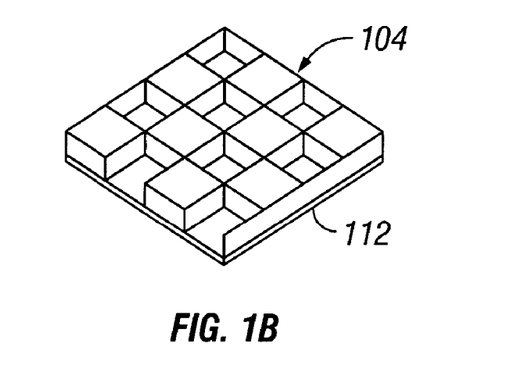
Figure 2:
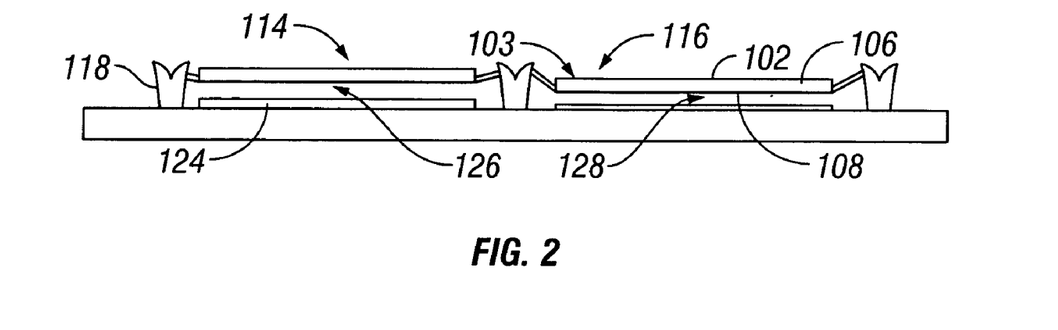
FIG. 2 illustrates some characteristics of a typical interferometric modulator (see FIG. 2 of U.S. Patent Publication No. 2002/0126364 A1).

Various examples of interferometric modulators are described in U.S. Patent Publication No. 2002/0126364 A1. FIGS. 1 and 2 illustrate some characteristics of a typical interferometric modulator (see FIGS. 1 and 2 of U.S. Patent Publication No. 2002/0126364 A1 and the corresponding text). Referring to FIGS. 1A and 1B, two interferometric modulator structures 114 and 116 each include a secondary mirror 102 with a corrugated pattern 104 etched into its upper (outer) surface 103, using any of a variety of known techniques. The corrugation does not extend through the membrane 106 on which the mirror is formed so that the inner surface 108 of the mirror remains smooth. FIG. 1B reveals the pattern of etched corrugation 104 on the secondary mirror and the smooth inner surface 112 which remains after etch. The corrugated pattern, which can be formed in a variety of geometries (e.g., rectangular, pyramidal, conical), provides structural stiffening of the mirror, making it more immune to variations in material stresses, reducing total mass, and preventing deformation when the mirror is actuated.

In general, an interferometric modulator which has either no voltage applied or some relatively steady state voltage, or bias voltage, applied is considered to be in a quiescent state and will reflect a particular color, a quiescent color. As referenced in U.S. Patent Publication No. 2002/0126364 A1, the quiescent color is determined by the thickness of the sacrificial spacer upon which the secondary mirror is fabricated.

Each interferometric modulator 114, 116 is rectangular and connected at its four corners to four posts 118 via support arms such as 120 and 122. In some cases (see discussion in U.S. Patent Publication No. 2002/0126364 A1), the interferometric modulator array will be operated at a selected constant bias voltage. In those cases, the secondary mirror 102 will generally maintain a quiescent position which is closer to corresponding primary mirror 128 than without any bias voltage applied. The fabrication of interferometric modulators with differently sized support arms allows for the mechanical restoration force of each interferometric modulator to be determined by its geometry. Thus, with the same bias voltage applied to multiple interferometric modulators, each interferometric modulator may maintain a different biased position (distance from the primary mirror) via control of the dimensions of the support arm and its resulting spring constant. The thicker the support arm is, the greater its spring constant. Thus different colors (e.g., red, green, and blue) can be displayed by different interferometric modulators without requiring deposition of different thickness spacers. Instead, a single spacer, deposited and subsequently removed during fabrication, may be used while color is determined by modifying the support arm dimensions during the single photolithographic step used to define the arms. For example, in FIG. 2, interferometric modulators 114, 116 are both shown in quiescent states with the same bias voltage applied. However, the gap spacing 126 for interferometric modulator 114 is larger than gap spacing 128 for interferometric modulator 116 by virtue of the larger dimensions of its respective support arms. Various other examples of interferometric modulators are also known.

U.S. Patent Publication No. 2002/0126364 A1 also describes various passive optical compensation structures for minimizing color shift as the angle of incidence changes (a characteristic typical of interferometric structures) and active optical compensation structures for supplying supplemental illumination. For example, as illustrated in FIGS. 3A-3F (see FIGS. 6A-6F of U.S. Patent Publication No. 2002/0126364 A1), an optical compensation film may be fabricated on the opposite surface of the substrate from which the array of light modulating elements resides. Such films can be designed and fabricated in a number of ways, and may be used in conjunction with each other.

Figures 3A, 3B:
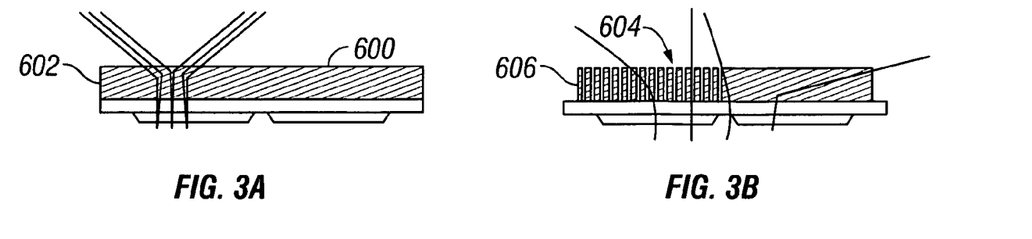
FIGS. 3A-3F illustrate optical compensation films fabricated on the opposite surface of the substrate from which an array of light modulating elements resides (see FIG. 6A-6F of U.S. Patent Publication No. 2002/0126364 A1).

In FIG. 3A, a passive optical compensation film 600 is a volume or surface relief holographic film. A volume holographic film may be produced by exposing a photosensitive polymer to the interference pattern produced by the intersection of two or more coherent light sources (e.g., lasers). Using the appropriate frequencies and beam orientations arbitrary periodic patterns of refractive indices within the film may be produced. A surface relief holographic film may be produced by creating a metal master using any number of microfabrication techniques known by those skilled in the art. The master is subsequently used to pattern the film. Such films can be used to enhance the transmission and reflection of light within a definable cone of angles, thus minimizing off-axis light. The colors and brightness of a display viewed with on axis light are enhanced and color shift is diminished because brightness goes down significantly outside of the cone.

In FIG. 3B, another approach is illustrated for a device 604 in which an array of passive optical compensation structures 606 is fabricated on the substrate. These structures, which can be fabricated using the techniques referenced in U.S. Patent Publication No. 2002/0126364 A1, can be considered photonic crystals, as described in the book "Photonic Crystals", by John D. Joannopoulos, et al. They are essentially three-dimensional interferometric arrays which demonstrate interference from all angles. This provides the ability to design waveguides which can perform a number of functions including channeling incident light of certain frequencies to the appropriately colored pixels, or by changing light of a certain incidence angle to a new incidence angle, or some combination of both.

Figure 3C:
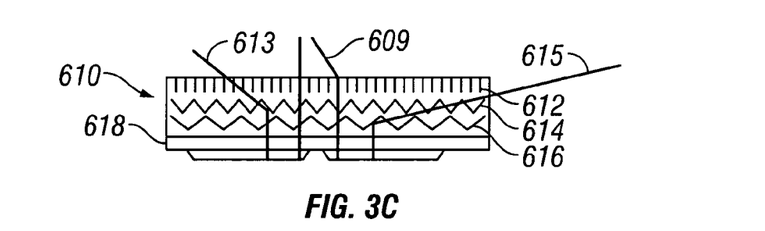

In another example of a passive optical compensation structure, seen in FIG. 3C, a three-layer polymeric film 610 contains suspended particles. The particles are actually single or multi-layer dielectric mirrors which have been fabricated in the form of microscopic plates. These plates, for example, may be fabricated by deposition of multilayer dielectric films onto a polymer sheet which, when dissolved, leaves a film which can "ground up" in a way which produces the plates. The plates are subsequently mixed into a liquid plastic precursor. By the application of electric fields during the curing process, the orientation of these plates may be fixed during manufacture. The mirrors can be designed so that they only reflect at a range of grazing angles. Consequently, light is either reflected or transmitted depending on the incidence angle with respect to the mirror. In FIG. 3C, layer 612 is oriented to reflect light 609 of high incidence that enters the film 610 closer to the perpendicular. Layer 614 reflects light 613 of lower incidence into a more perpendicular path. Layer 616 modifies the even lower angle incident light 615. Because the layers minimally affect light which approaches perpendicularly, they each act as a separate "angle selective incidence filter" with the result that randomly oriented incident light couples into the substrate with a higher degree of perpendicularly. This minimizes the color shift of a display viewed through this film.

Figure 3D:
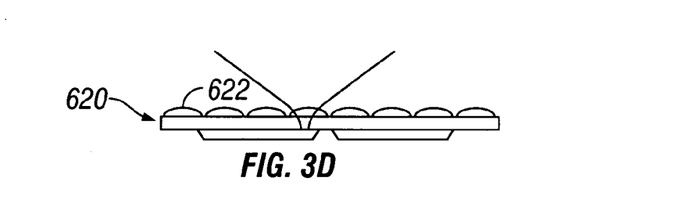

In another example of a passive optical compensation structure, illustrated in FIG. 3D, micro lenses 622 are used in an array in device 620. Each lens 622 may be used to enhance the fill factor of the display by effectively magnifying the active area of each pixel. This approach may be used by itself or in conjunction with the other color shift compensation films.

Figure 3E:
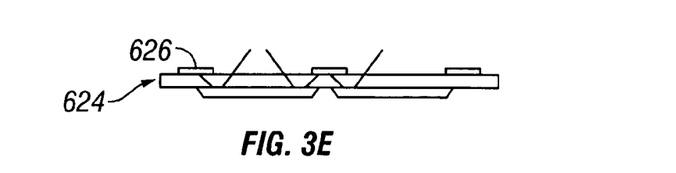
Figure 3F:
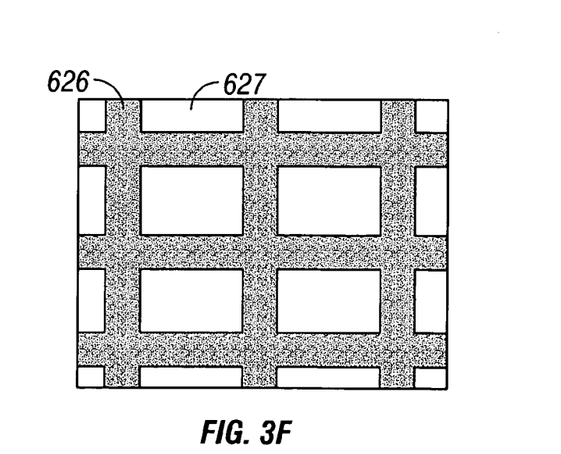

In an example of an active optical compensation structure, illustrated in FIG. 3E, device 624 uses supplemental lighting in the form of a frontlighting array. In this case an organic light emitting material 626, for example, Alq/diamine structures and poly(phenylene vinylene), can be deposited and patterned on the substrate. The top view, FIG. 3F, reveals a pattern 627 which corresponds with the interferometric modulator array underneath. That is, the light emitting areas 626 are designed to obscure the inactive areas between the interferometric modulator, and allow a clear aperture in the remaining regions. Light is actively emitted into the substrate onto the interferometric modulator and is subsequently reflected back to the viewer. Conversely, a patterned emitting film may be applied to the backplate of the display and light transmitted forward through the gaps between the sub-pixels. By patterning a mirror on the front of the display, this light can be reflected back upon the interferometric modulator array. Peripherally mounted light sources in conjunction with films relying on total internal reflection are yet another approach. U.S. Pat. No. 6,055,090 also discloses an interferometric modulator having an active optical compensation structure that includes a supplemental frontlighting source.

Figure 4:
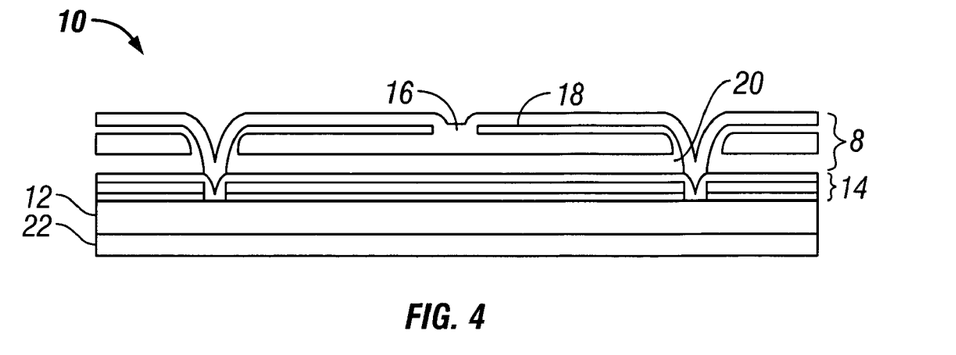
FIG. 4 illustrates an optical compensation film (diffuser) fabricated on the opposite surface of the substrate from which a light modulating element resides.

FIG. 4 illustrates an interferometric modulator 10 comprising a passive optical compensation film (a diffuser 22) fabricated on the opposite surface of the substrate from which a light modulating element resides. The diffuser 22 generally compensates for the specular appearance of an uncompensated spatial light modulator array, e.g., by making the reflective array appear less like a mirror and more like paper. In FIG. 4, a light modulating element 8 comprises a movable wall or element 16, a cavity 20, and a support post 18. As illustrated in FIG. 4, the movable wall 16 is supported over the cavity 20 by the support post 18. An optical stack 14 forms a wall of the cavity 20 opposite to the movable wall 16. The optical stack 14 may be considered part of the light modulating element 8. The optical stack 14 is fabricated on a transparent substrate 12, and the diffuser 22 is fabricated on the opposite side of the substrate 12 from the light modulating element 8. In operation, the movable wall 16 moves through planes parallel to the front wall of the cavity 20. The movable wall 16 is highly reflective and typically comprises a metal. As the movable wall 16 moves toward the optical stack 14 on the opposite side of the cavity 12, self-interference of light (typically entering through the transparent substrate 12 and the optical stack 14) within the cavity 20 occurs. The color of the reflected light that exits the cavity through the transparent substrate 12 and the optical stack 14 may be controlled by varying the distance between the optical stack 14 and the movable wall 16. The surface of the transparent substrate 12 in contact with the optical stack 14 is the surface upon which the light modulating element 8 is fabricated. The diffuser 22 is typically fabricated or attached to the opposite surface of the transparent substrate 12 after fabrication of the light modulating element 8.

As illustrated in FIG. 4 and by the disclosure of U.S. Patent Publication No. 2002/0126364 A1, passive optical compensation structures for spatial light modulators are typically fabricated on the opposite surface of the substrate from which the array of light modulating elements resides to facilitate existing manufacturing process flows.

Manufacturing of the overall display system typically involves producing the various components separately, such as the passive optical compensation structures, the interferometric modulator structures, the driver electronics, the graphics control functions, etc., and then integrating them at a later stage in the manufacturing process flow. Producing the various components separately and then integrating them at a later stage simplifies the delicate task of manufacturing the light modulating elements by reducing the need for complex deposition and micro-fabrication schemes.

As spatial light modulators become increasingly sophisticated, it is anticipated that difficulties associated with fabricating them by current manufacturing process flows will also increase. Accordingly, spatial light modulators having integrated optical compensation structures and methods for making them have been developed. An embodiment provides spatial light modulators having an integrated optical compensation structure, e.g., an optical compensation structure located between the substrate and the light-modulating elements, or an optical compensation structure located on the opposite side of the light-modulating elements from the substrate. The optical compensation structure may be active or passive, as desired. In this context, a "passive" optical compensation structure is one that does not supply a supplemental frontlighting source.

As discussed above, FIG. 4 illustrates a passive optical compensation film (a diffuser 22) fabricated on the opposite surface of the substrate from which a light modulating element resides. In FIG. 4, the light modulating element 8 is an interferometric modulator comprising the movable wall or element 16, the cavity 12, the support post 18. The optical stack 14 is fabricated on the transparent substrate 12, and the diffuser 22 is fabricated on the opposite side of the substrate 12 from the light modulating element 8. The optical stack 14 may be considered part of the light modulating element 8. Those skilled in the art appreciate that, in some embodiments, an interferometric modulator may modulate between a black, or absorbing state, and a reflecting state. The reflecting state is a non-interference based state that appears to be white. While the white state in these embodiments does not particularly depend on the interference characteristics of the modulator, the modulating elements preferably have a structure that is similar to those embodiments of interferometric modulators that rely upon the interference characteristics and will be referred to as such herein. Interferometric modulators may modulate between an absorbing state and an interference state, between an absorbing state and a reflective state, between a reflective state and an interference state, or between two different interference states.

Figure 5A:
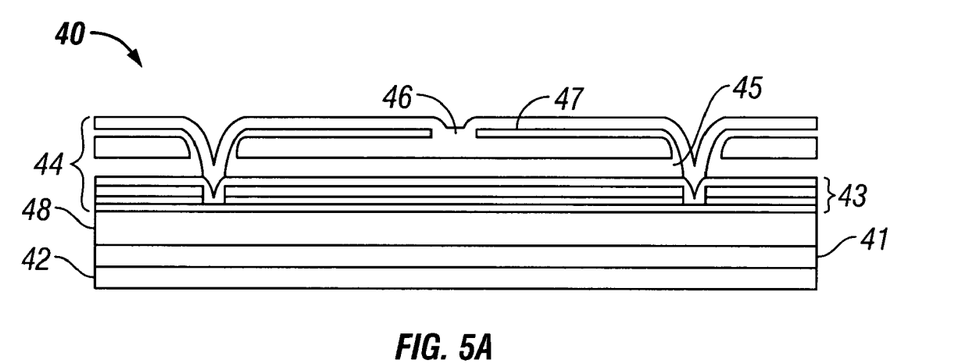
FIGS. 5A to 5C illustrate various embodiments of spatial light modulators comprising integrated optical compensation structures.

FIG. 5A illustrates an embodiment of a spatial light modulator 40 in which a passive optical compensation structure (diffuser 41) is arranged between a substrate 42 and a light-modulating element 44, rather than being on the opposite side of the substrate from the light modulating element as shown in FIG. 4. In the embodiment illustrated in FIG. 5A, the light-modulating element 44 is an interferometric modulator comprising a cavity 45, a movable wall 46, an optical stack 43, and a support 47. The optical stack 43 is on the wall of the cavity 45 that is opposite to the movable wall 46. In the illustrated embodiment, the spatial light modulator 40 further comprises a planarization layer 48 between the substrate 42 and the optical stack 43. Both the movable wall 46 and the optical stack 43 are reflective, so that operation of spatial light modulator 40 is generally similar to that described for the spatial light modulator 10 illustrated in FIG. 4. Typically, the substrate 42 is at least partially transparent. Those skilled in the art will appreciate that the light-modulating element 44 may be configured in an array comprising a plurality of individually addressable light-modulating elements arranged over a transparent substrate and configured to modulate light transmitted through the transparent substrate.

Those skilled in the art will also appreciate that the diffuser 41 illustrated in FIG. 5A is representative of various optical compensation structures (both active and passive) that may be arranged between the substrate and the plurality of individually addressable light-modulating elements. For example, an active optical compensation structure may supply a supplemental frontlighting source. Non-limiting examples of passive optical compensation structures include an anti-reflective layer, a diffractive optical element, a structure that scatters light, a black mask, a color filter, a microlens array, a holographic film (e.g., that mitigates a shift in reflected color with respect to an angle of incidence of the light transmitted through the transparent substrate), or a combination thereof. In FIG. 5, the light-modulating element 44 comprises an interferometric modulator, but other spatial light modulators may also be used.

Figure 5B:
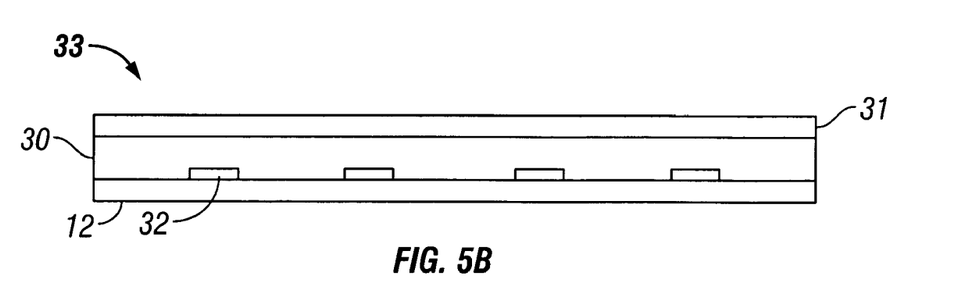

FIG. 5B illustrates an embodiment of a spatial light modulator 33 in which a passive optical compensation structure (black mask 32) is arranged between a transparent substrate 12 and a reflecting element 31. The reflecting element may be an optical stack. Black masks such as the black mask 32 may be used to mask parts of the spatial light modulator structure that are not desirable for the viewer to see. A light modulating element or elements (e.g., a plurality of individually addressable light-modulating elements) are omitted from FIG. 5B for clarity, but are understood to be arranged over the transparent substrate 12 and configured to modulate light transmitted through the transparent substrate 12. For example, the light modulating element of FIG. 5B may comprise a plurality of individually addressable light-modulating elements arranged over the reflecting element 31 as discussed above with respect to FIG. 5A. The spatial light modulator 33 may include a planarization layer 30, e.g., between the black mask 32 and the reflecting element 31 as shown in FIG. 5B.

Figure 5C:
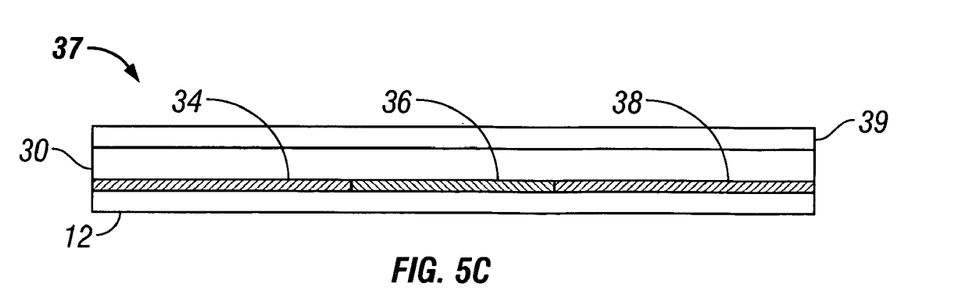

FIG. 5C illustrates an embodiment of a spatial light modulator 37 in which a passive optical compensation structure (comprising color filter elements 34, 36, 38) is arranged between a transparent substrate 12 and a reflecting element 39. As in FIG. 5B, the reflecting element 39 may be an optical stack. In the illustrated embodiment, the color filter elements 34, 36, 38 are red, green and blue, respectively, but other colors may be selected by those skilled in the art so that the resulting spatial light modulator produces the desired colors. As in FIG. 5B, a light modulating element or elements (e.g., a plurality of individually addressable light-modulating elements) are omitted from FIG. 5C for clarity, but are understood to be arranged over the transparent substrate 12 and configured to modulate light transmitted through the transparent substrate 12. For example, the light modulating element of FIG. 5C may comprise a plurality of individually addressable light-modulating elements arranged over the optical stack as discussed above with respect to FIG. 5A. The spatial light modulator 37 may include a planarization layer 30, e.g., between the color filter elements 34, 36, 38 and the optical stack 39 as shown in FIG. 5C.

The use of a color filter may increase the performance of the spatial light modulator by enhancing color saturation. Also, interferometric modulators that produce only black and white may be used in combination with color filters to produce colored light.

Interferometric modulators may be fabricated to produce various colors by varying the size of the cavity. However, varying the size of the cavity may involve varying the manufacturing process, e.g., by manufacturing a different size cavity for an interferometric modulator that produces green light than for an interferometric modulator that produces red light. The use of black and white interferometric modulators in combination with color filters may substantially simplify the manufacturing process. Other improvements in the manufacturing process are realized by integrating the color filter into the interferometric modulator as illustrated in FIG. 5C.

Figure 6:
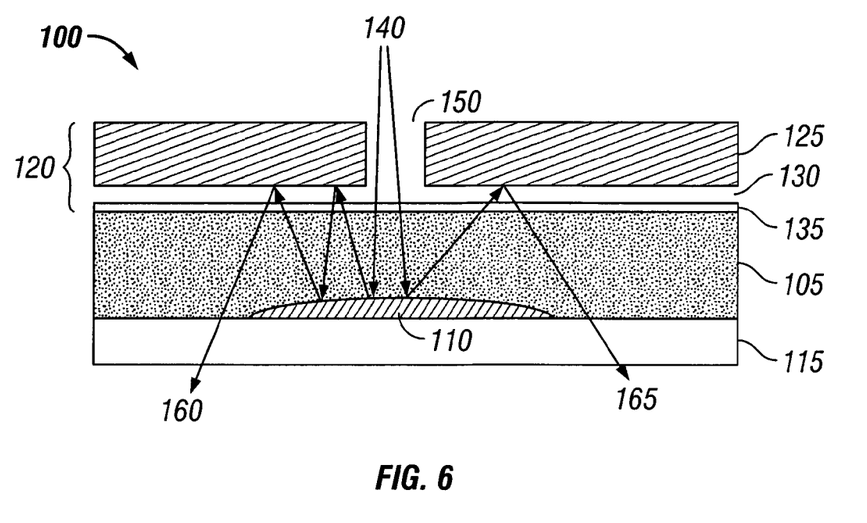
FIG. 6 illustrates an embodiment of a spatial light modulator comprising an integrated optical compensation structure that scatters light.

FIG. 6 illustrates an embodiment of a spatial light modulator 100 in which a passive optical compensation structure 105 (a planarization layer comprising a scattering element 110) is arranged between a transparent substrate 115 and a light-modulating element 120. In the embodiment illustrated in FIG. 6, the light-modulating element 120 is an interferometric modulator comprising a cavity 130, a movable wall 125, and an optical stack 135. The optical stack 135 is on the wall of the cavity 130 that is opposite to the movable wall 125. Both the movable wall 125 and the optical stack 135 are reflective (the optical stack 135 is partially reflective), so that operation of spatial light modulator 100 is generally similar to that described for the spatial light modulator 10 illustrated in FIG. 4. Light 140 passes through a slot 150 in the movable wall 125 and reflects from the scattering element 110 such that it scatters the light 140 back to the movable wall 125 (and in some cases back again to the scattering element 110), ultimately passing through the transparent substrate 115 and exiting 160, 165 as shown in FIG. 6. Preferably, the scattering element 110 is shaped such that the light 140 is scattered randomly. For clarity, a single scattering element 110 and a single slot 150 are illustrated in FIG. 6, but it will be understood that the spatial light modulator 100 may comprise a plurality of scattering elements and slots, arranged to provide the desired amount of scattered light.

Figure 7A:
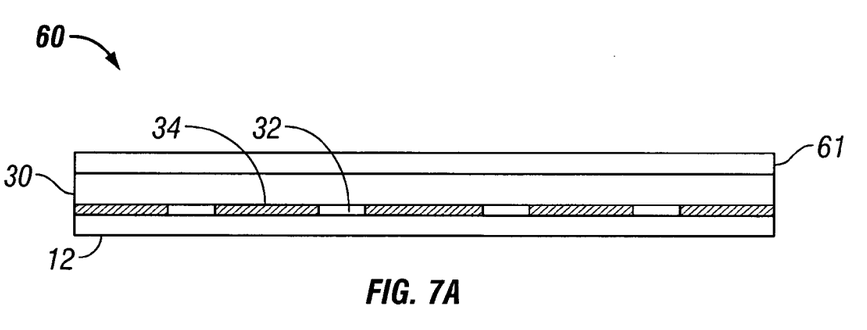
FIGS. 7A and 7B illustrate various embodiments of spatial light modulators comprising integrated optical compensation structures.
Figure 7B:
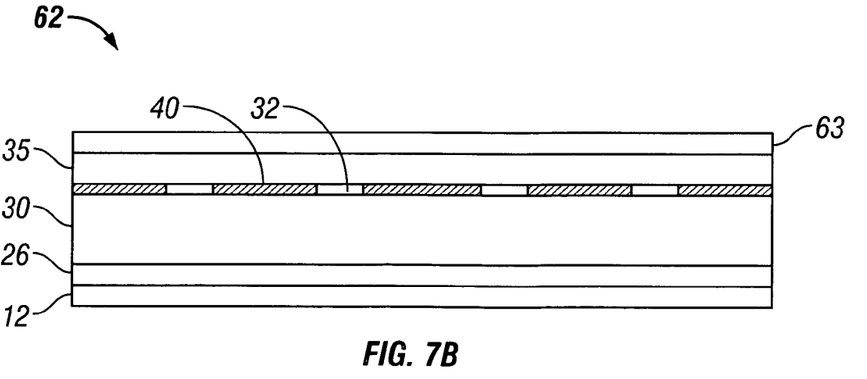

FIGS. 7A and 7B illustrate embodiments of spatial light modulators comprising different combinations of integrated optical compensation structures. FIG. 7A illustrates an embodiment of a spatial light modulator 60 in which a passive optical compensation structure (comprising a color filter element 34 and a black mask 32) is arranged between a transparent substrate 12 and an optical stack 61. FIG. 7B illustrates an embodiment of a spatial light modulator 62 in which a first passive optical compensation structure (comprising a color filter element 40 and a black mask 32) and a second passive optical compensation structure (comprising diffuser 26) are arranged between a transparent substrate 12 and an optical stack 63. As in FIGS. 5B and 5C, a light modulating element or elements (e.g., a plurality of individually addressable light-modulating elements) are omitted from FIGS. 7A and 7B for clarity, but are understood to be arranged over the transparent substrate 12 and configured to modulate light transmitted through the transparent substrate. The spatial light modulators 60, 62 may include a planarization layer 30 e.g., between the passive optical compensation structure (comprising the color filter element 34 and the black mask 32) and the optical stack 61 as shown in FIG. 7A, or between the first and second passive optical compensation structures as shown in FIG. 7B. The spatial light modulator may include an additional planarization layer, e.g., a planarization layer 35 as shown in FIG. 7B between the first passive optical compensation structure (comprising a color filter element 40 and a black mask 32) and the optical stack 63.

Spatial light modulators may comprise an optical compensation structure that performs one or more functions (e.g., a color filter and a black mask as illustrated in FIG. 7A), and/or the optical compensation structure may comprise multiple layers, optionally separated from each other by planarization layers (e.g., as illustrated in FIG. 7B). Those skilled in the art will understand that the term "optical compensation structure" may be used to refer to a structure having a particular function (e.g., the diffuser 26), a layer having multiple functions (e.g., comprising the color filter element 34 and the black mask 32), or multiple layers each having one or more functions as illustrated in FIG. 7B, optionally including planarization layer(s). Thus, spatial light modulators may comprise any combination of active and/or passive optical compensation structures, e.g., a black mask and a color filter; a black mask and a diffuser; a color filter and a diffuser; a black mask, color filter and a diffuser, etc. Means for compensating the light transmitted through the transparent substrate include optical compensation structures as described herein.

Figure 8:
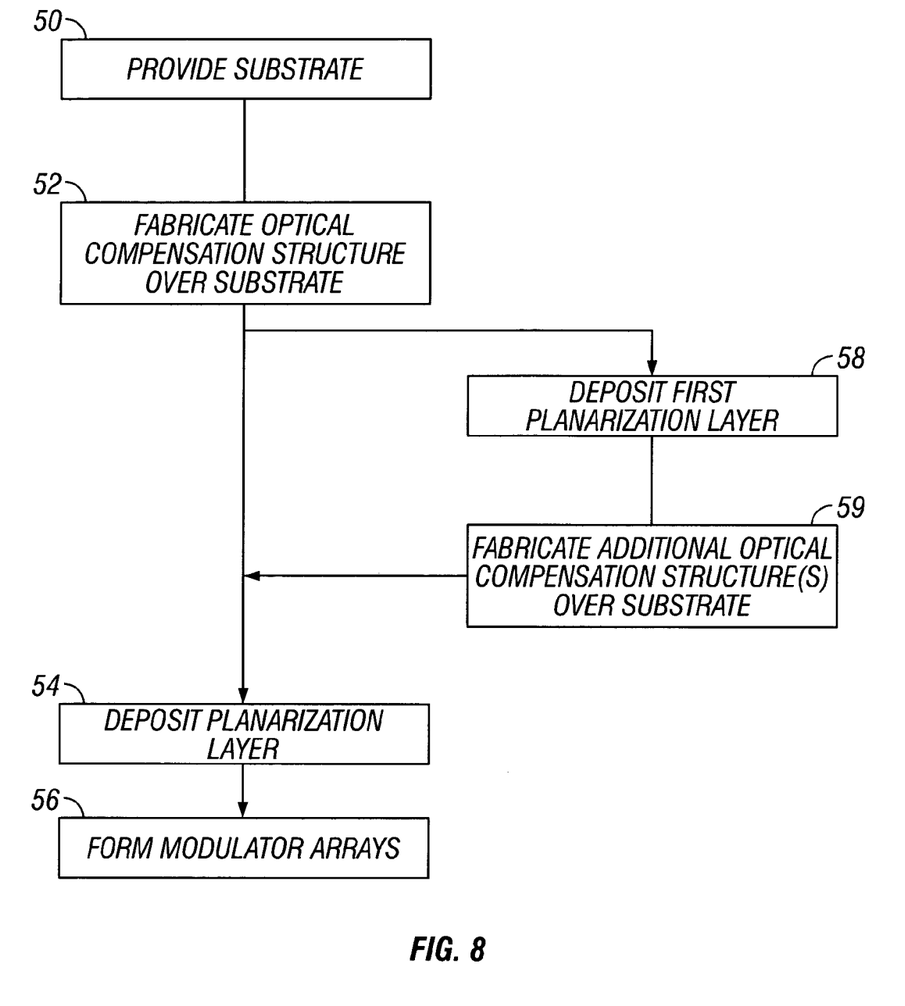
FIG. 8 illustrates an embodiment of a manufacturing process flow diagram for making spatial light modulators comprising integrated optical compensation structures.

Spatial light modulators comprising an optical compensation structure may be fabricated by integrating the fabrication of the optical compensation structure into the process for fabricating the spatial light modulator. An example of such a process is illustrated in FIG. 8. The process begins with the substrate being provided at step 50. Typically, the substrate is glass, plastic or other transparent substrate. Those skilled in the art will appreciate that the term "transparent" as used herein encompasses materials that are substantially transparent to the operational wavelength(s) of the spatial light modulator, and thus transparent substrates need not transmit all wavelengths of light and may absorb a portion of the light at the operational wavelength(s) of the spatial light modulator. For example, the transparent substrate may be tinted and/or polarized if desired for a particular application. Thus, the transparency and reflectivity of the substrate may be varied, depending on the configuration and the function desired. In some embodiments, the substrate is at least partially transparent and may be substantially transparent. In other embodiments, the substrate is at least partially reflective and may be substantially reflective. It is understood that a substrate may be both partially transparent and partially reflective.

The process illustrated in FIG. 8 continues at step 52 with the fabrication of the optical compensation structure. Depending on the structure, the materials and methods used for its fabrication may vary. For example, it is often convenient to fabricate the optical compensation structures using techniques and methods compatible with the manufacturing of the individually addressable light-modulating elements, e.g., by spin coating and/or chemical vapor deposition techniques. For example, a diffuser film may be fabricated by spin-coating the substrate using a polymer or polymer solution that contains scattering elements dispersed therein. For example, the polymer may be a polyimide and the scattering elements may be microscopic glass beads. Color filters and black masks may be appropriately dyed photoresist polymers fabricated on the substrate using known photoresist deposition and masking techniques. Black masks may also be inorganic materials such as chrome oxide, also known as black chrome, fabricated on the substrate using known deposition and masking techniques.

The process illustrated in FIG. 8 continues at step 54 with the deposition of a planarization layer. The planarization layer or layers are typically polymers, e.g., polyimide, and may be deposited using known deposition and masking techniques. The deposition of a planarization layer is an optional, but is often preferred because it results in a suitable substrate for subsequent processing steps. The process illustrated in FIG. 8 continues at step 56 with the fabrication of individually addressable light-modulating elements (e.g., interferometric modulator elements) over the optical compensation structure and, if present, the planarization layer. Interferometric modulators are generally fabricated using thin film deposition processes, e.g., as described in U.S. Pat.

Nos. 5,835,255 and 6,055,090, and in U.S. Patent Publication No. 2002/0126364 A1. A variation of this process, also illustrated in FIG. 8, involves the fabrication of an additional planarization layer at step 58, followed by the fabrication of an additional optical compensation structure at step 59. After fabrication at step 59, the fabrication process may return to steps 58, 59 for the fabrication of additional planarization layer(s) and optical compensation structure(s), or may proceed to steps 54, 56 for the fabrication of the planarization layer and individually addressable light-modulating elements. Those skilled in the art will understand that the process illustrated in FIG. 8 or variations thereof may be used to fabricate the spatial light modulators described herein, including without limitation the spatial light modulators illustrated in FIGS. 5-7. Means for modulating light transmitted through the transparent substrate include interferometric modulators and liquid crystal displays.

Figure 9:
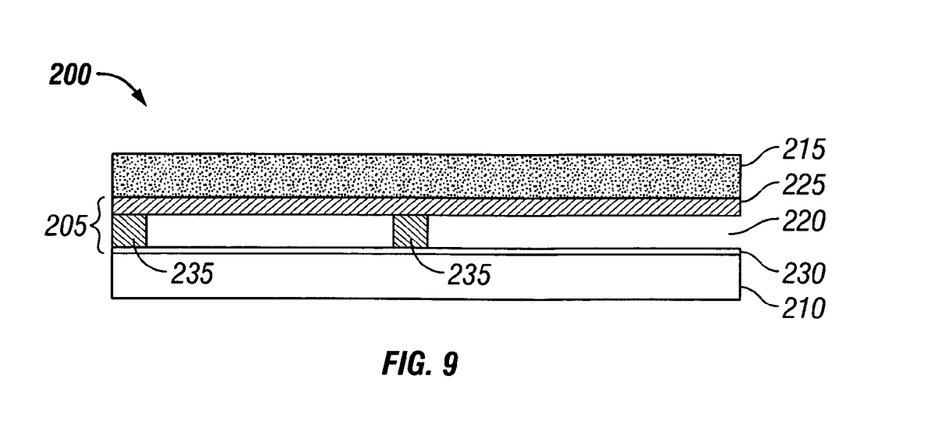
FIG. 9 illustrates an embodiment of a spatial light modulator comprising an integrated optical compensation structure.

FIG. 9 illustrates an embodiment of a spatial light modulator 200 in which a light modulating element 205 is arranged between a substrate 210 and an optical compensation structure 215. In the embodiment illustrated in FIG. 9, the light-modulating element 205 is an interferometric modulator comprising a cavity 220, a movable wall 225, an optical stack 230, and supports 235. The optical stack 230 is on the wall of the cavity 220 that is opposite to the movable wall 225. The optical compensation structure 215 may be any of the optical compensation structures described herein, e.g., an active optical compensation structure that supplies a supplemental frontlighting source, and/or a passive optical compensation structure, e.g., an anti-reflective layer, a diffractive optical element, a structure that scatters light, a black mask, a color filter, a diffuser, a microlens array, a holographic film that mitigates a shift in reflected color with respect to an angle of incidence of the light transmitted through the substrate, or a combination thereof. In FIG. 9, the light-modulating element 205 comprises an interferometric modulator, but other spatial light modulators may also be used.

A spatial light modulator in which a light modulating element is arranged between a substrate and an optical compensation structure (such as that illustrated in FIG. 9) may be fabricated by a process similar to that illustrated in FIG. 8, except that the individually addressable light-modulating elements are fabricated over the substrate, followed by fabrication of the optical compensation structure(s) over the individually addressable light-modulating elements (e.g., step 56 in FIG. 8 is conducted after step 50 and prior to step 52). Optionally, a planarization layer may be fabricated over the over the individually addressable light-modulating elements, followed by fabrication of the optical compensation structure(s) over the planarization layer.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others.

What is claimed is:

1. A spatial light modulator comprising:
    a substrate;
    a plurality of individually addressable light-modulating elements arranged over the substrate and configured to interferometrically modulate light transmitted through the substrate;
    a diffuser; and
    an optical compensation structure, the optical compensation structure different from the diffuser;
    wherein the diffuser and the optical compensation structure are arranged between the substrate and the plurality of individually addressable light-modulating elements.

2. The spatial light modulator of claim 1 in which the interferometric modulator comprises a movable element and a cavity.

3. The spatial light modulator of claim 1 in which the optical compensation structure comprises a black mask.

4. The spatial light modulator of claim 1 in which the optical compensation structure comprises a color filter.

5. The spatial light modulator of claim 1 in which the optical compensation structure comprises an anti-reflective layer.

6. The spatial light modulator of claim 1 in which the optical compensation structure comprises a plurality of scattering elements.

7. The spatial light modulator of claim 1 in which the optical compensation structure comprises a microlens array.

8. The spatial light modulator of claim 1 in which the optical compensation structure comprises a holographic film that mitigates a shift in reflected color with respect to an angle of incidence of the light transmitted through the substrate.

9. The spatial light modulator of claim 1 in which the optical compensation structure comprises a diffractive optical element.

10. The spatial light modulator of claim 1 in which the optical compensation structure comprises a planarization layer that comprises a scattering element.

11. The spatial light modulator of claim 1 in which the individually addressable light-modulating elements comprise an interferometric modulator and in which the optical compensation structure is selected from the group consisting of black mask and color filter.

12. The spatial light modulator of claim 1 in which the optical compensation structure comprises a black mask and a color filter.

13. The spatial light modulator of claim 1 in which the optical compensation structure is a passive optical compensation structure.

14. The spatial light modulator of claim 1 further comprising a planarization layer.

15. The spatial light modulator of claim 1 in which the substrate is partially reflective.

16. The spatial light modulator of claim 1 in which the optical compensation structure is arranged between the diffuser and the plurality of individually addressable light-modulating elements.

17. A spatial light modulator comprising:
    a transparent substrate;
    a plurality of individually addressable interferometric light-modulating elements arranged over the transparent substrate and configured to modulate light transmitted through the transparent substrate, the interferometric light-modulating elements comprising a cavity and a movable wall; and
    a plurality of different optical compensation structures arranged between the transparent substrate and the plurality of individually addressable interferometric light-modulating elements, at least one of the optical compensation structures comprising a diffuser.

18. A spatial light modulator comprising:
a substrate;
a means for interferometrically modulating light transmitted through or reflected from the substrate;
a means for diffusing the light transmitted through or reflected from the substrate; and
a means for compensating the light transmitted through or reflected from the substrate, the means for compensating the light being different from the means for diffusing the light;
wherein the means for diffusing the light and the means for compensating the light are operatively arranged between the substrate and the means for modulating light transmitted through or reflected from the substrate.

19. The spatial light modulator of claim 18 in which the means for modulating light transmitted through or reflected from the substrate comprises a plurality of interferometric modulators.

20. The spatial light modulator of claim 18 in which the means for compensating the light transmitted through or reflected from the substrate comprises a structure selected from the group consisting of a black mask, a diffractive optical element, a color filter, an anti-reflective layer, a plurality of scattering elements, a microlens array, and a holographic film.

21. The spatial light modulator of claim 18 in which the means for compensating the light transmitted through or reflected from the substrate comprises a structure selected from the group consisting of a black mask and a color filter.

22. A spatial light modulator comprising:
a substrate;
a plurality of individually addressable light-modulating elements arranged over the substrate and configured to interferometrically modulate light transmitted through the substrate;
a first optical compensation structure; and
a second optical compensation structure, the second optical compensation structure different from the first optical compensation structure, the second optical compensation structure selected from the group consisting of an anti-reflective layer, a plurality of scattering elements, a microlens array, a holographic film that mitigates a shift in reflected color with respect to an angle of incidence of the light transmitted through the substrate, and a diffractive optical element;
wherein the first and second optical compensation structures are arranged between the substrate and the plurality of individually addressable light-modulating elements.

23. The spatial light modulator of claim 22 in which the interferometric modulator comprises a movable element and a cavity.

24. The spatial light modulator of claim 22 in which the first optical compensation structure comprises a black mask.

25. The spatial light modulator of claim 22 in which the first optical compensation structure comprises a color filter.

26. The spatial light modulator of claim 22 in which the individually addressable light-modulating elements comprise an interferometric modulator and in which the first optical compensation structure is selected from the group consisting of black mask and color filter.

27. The spatial light modulator of claim 22 in which the first optical compensation structure comprises a black mask and a color filter.

28. The spatial light modulator of claim 22 in which the first optical compensation structure is a passive optical compensation structure.

29. The spatial light modulator of claim 22 in which a planarization layer comprises the second optical compensation structure.

30. The spatial light modulator of claim 22 in which the substrate is partially reflective.

31. The spatial light modulator of claim 22 in which the second optical compensation structure is an anti-reflective layer.

32. The spatial light modulator of claim 22 in which the second optical compensation structure is a plurality of scattering elements.

33. The spatial light modulator of claim 22 in which the second optical compensation structure is a microlens array.

34. The spatial light modulator of claim 22 in which the second optical compensation structure is a holographic film that mitigates a shift in reflected color with respect to an angle of incidence of the light transmitted through the substrate.

35. The spatial light modulator of claim 22 in which the second optical compensation structure is a diffractive optical element.

36. The spatial light modulator of claim 22 in which the first optical compensation structure is arranged between the second optical compensation structure and the plurality of individually addressable light-modulating elements.

* * * * *

UNITED STATES PATENT AND TRADEMARK OFFICE
CERTIFICATE OF CORRECTION

PATENT NO. : 7,342,705 B2  Page 1 of 1
APPLICATION NO. : 11/036965
DATED : March 11, 2008
INVENTOR(S) : Clarence Chui et al.

It is certified that error appears in the above-identified patent and that said Letters Patent is hereby corrected as shown below:

At column 2, lines 58-64, delete "wherein the means . . . from the substrate." and insert the same on column 2, line 57, after "substrate;" as a continuation of the Paragraph.

At column 3, line 31, delete "FIG." and insert -- FIGS. --, therefor.

At column 5, line 39, delete "can"ground" and insert -- can "ground --, therefor.

At column 5, lines 52-53, delete "separate"angle" and insert -- separate "angle --, therefor.

At column 6-7, lines 60-67 (Col. 6) and lines 1-2 (Col. 7), delete "Manufacturing of the . . . micro-fabrication schemes." and insert the same on column 6, line 59, after "flows." as a continuation of the Paragraph.

At column 6, line 64, delete "fimctions," and insert -- functions, --, therefor.

At column 8-9, lines 60-67 (Col. 8) and 1-4 (Col. 9), delete "Interferometric modulators . . . illustrated in FIG. 5C." and insert the same on column 8, line 59, after "light." as a continuation of the Paragraph.

At column 11, line 49, before "individually" delete "over the".

Signed and Sealed this

Third Day of August, 2010

David J. Kappos
*Director of the United States Patent and Trademark Office*